No. 803,458. PATENTED OCT. 31, 1905.
J. ZOLLINGER.
SELF PROPELLED HARVESTING MACHINE.
APPLICATION FILED AUG. 18, 1905.
5 SHEETS—SHEET 1.
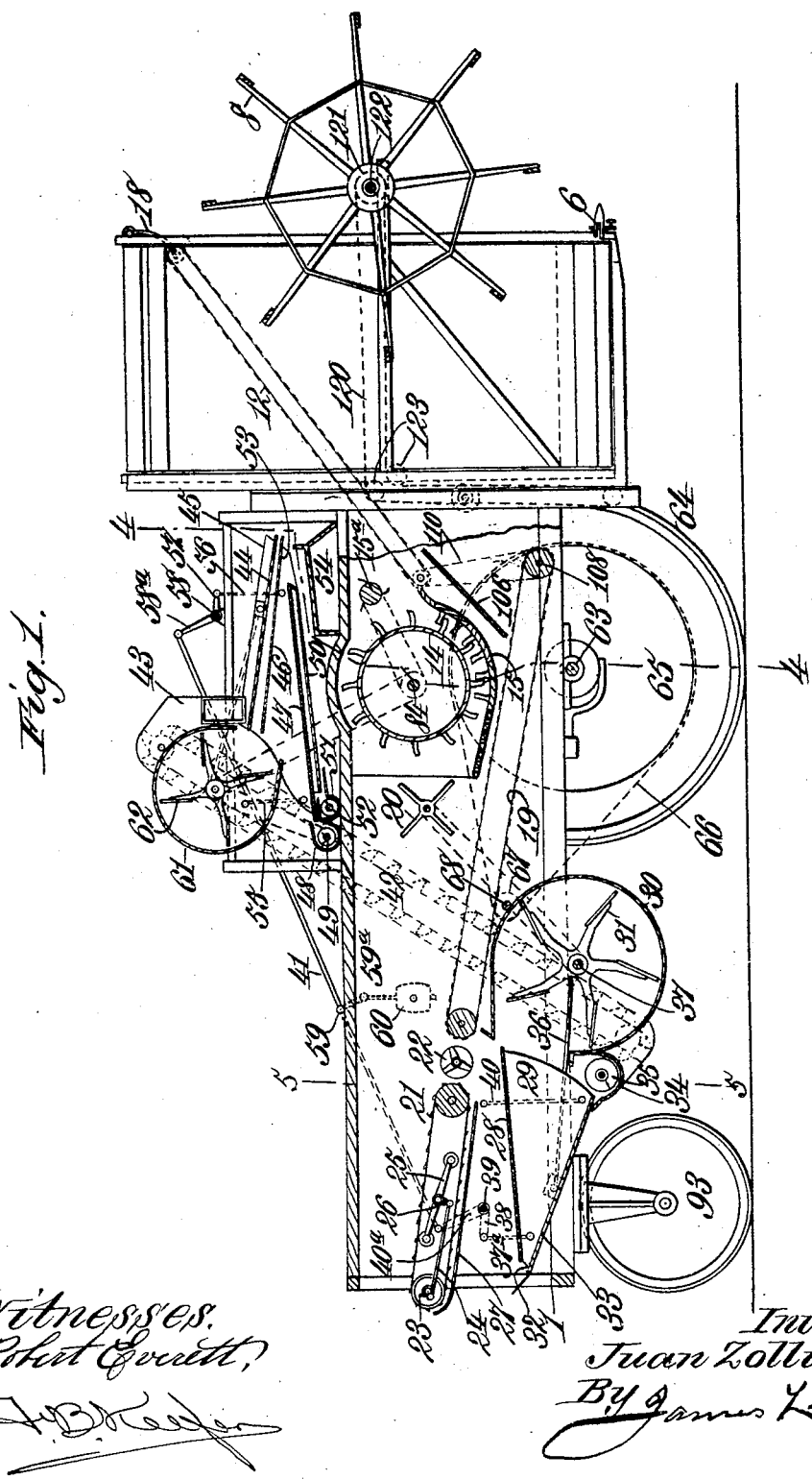

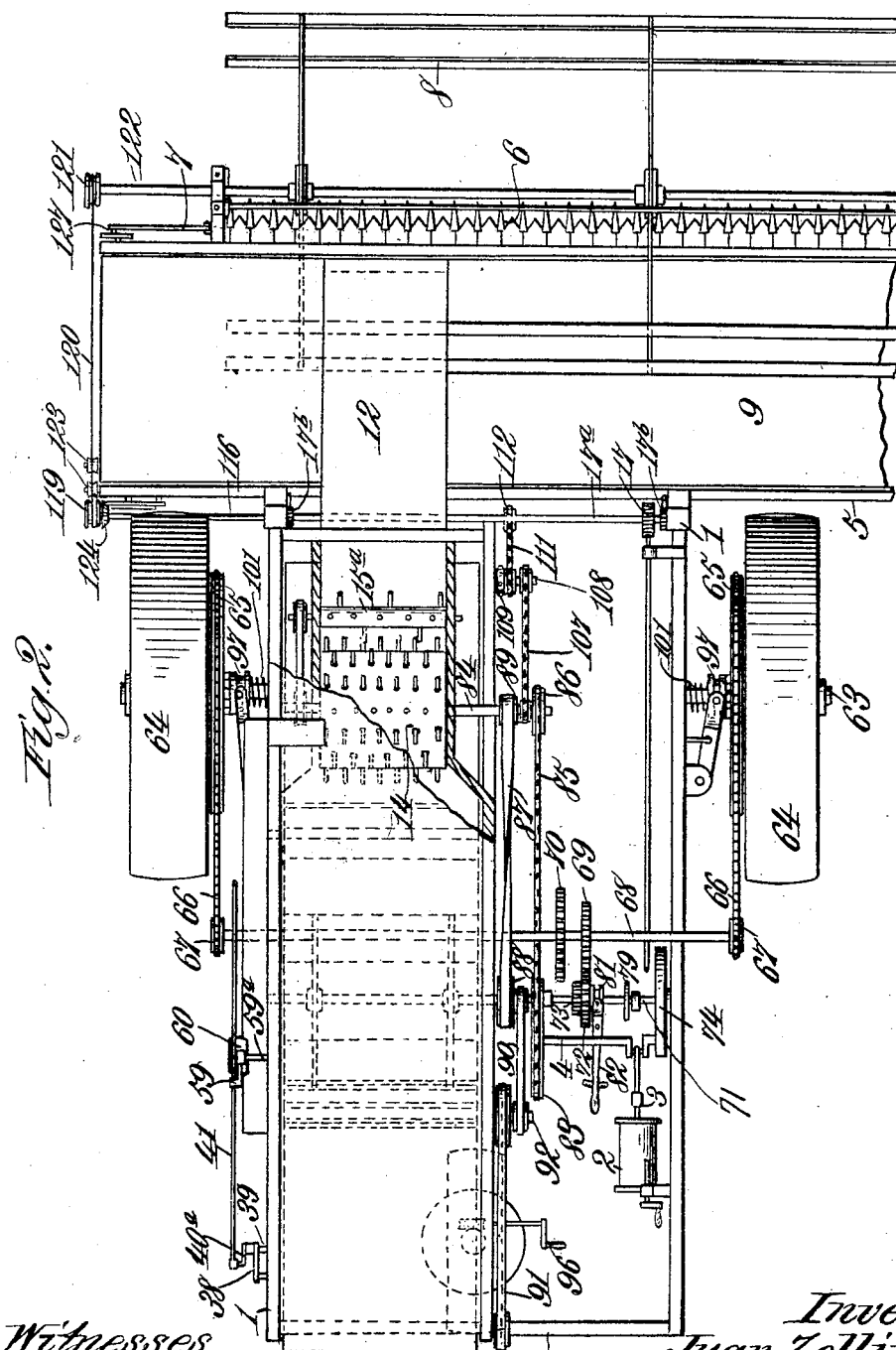

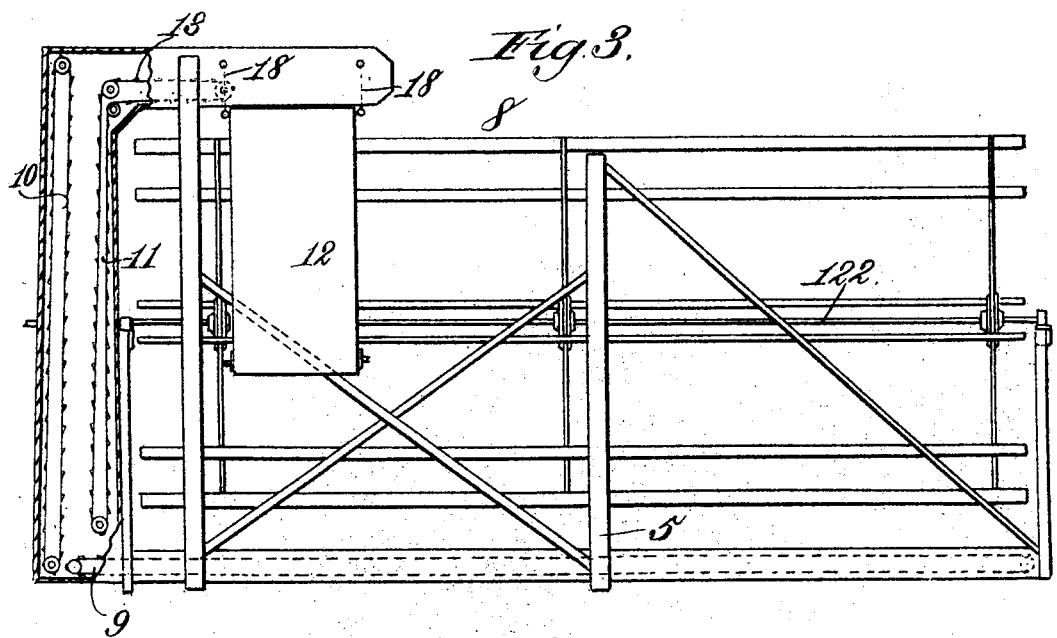
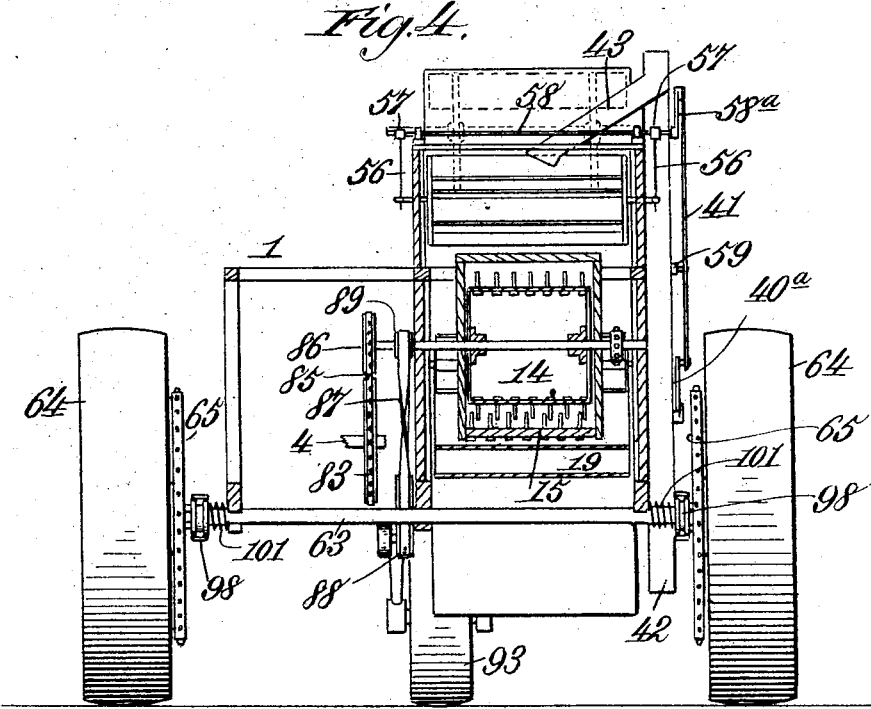

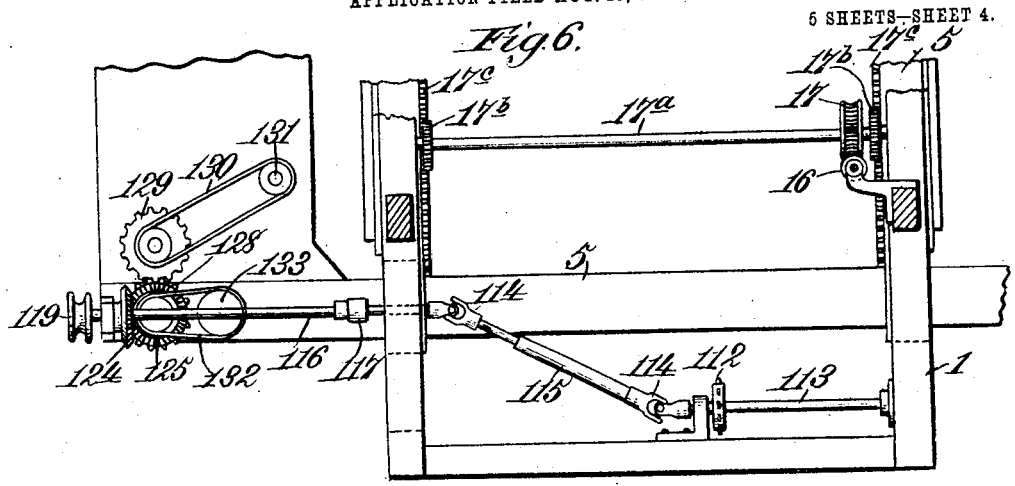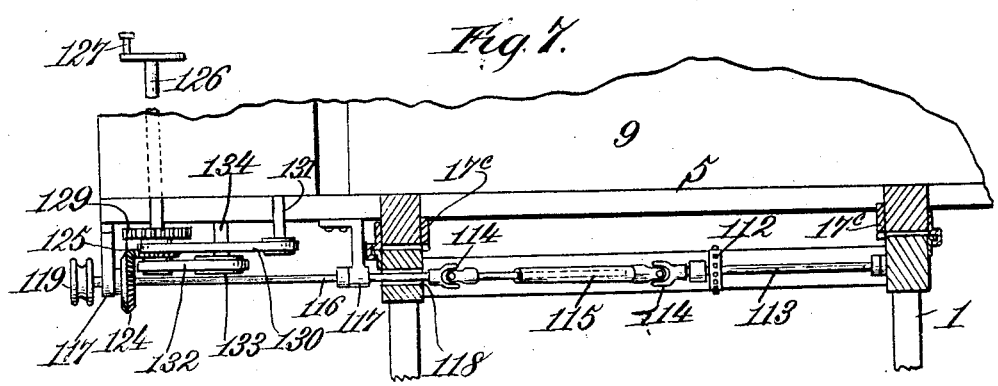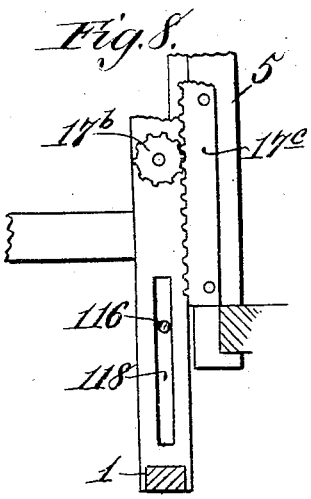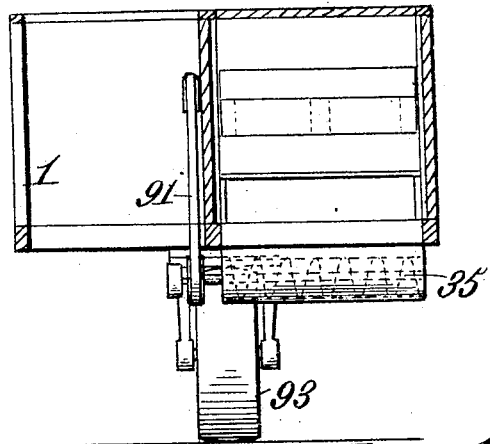

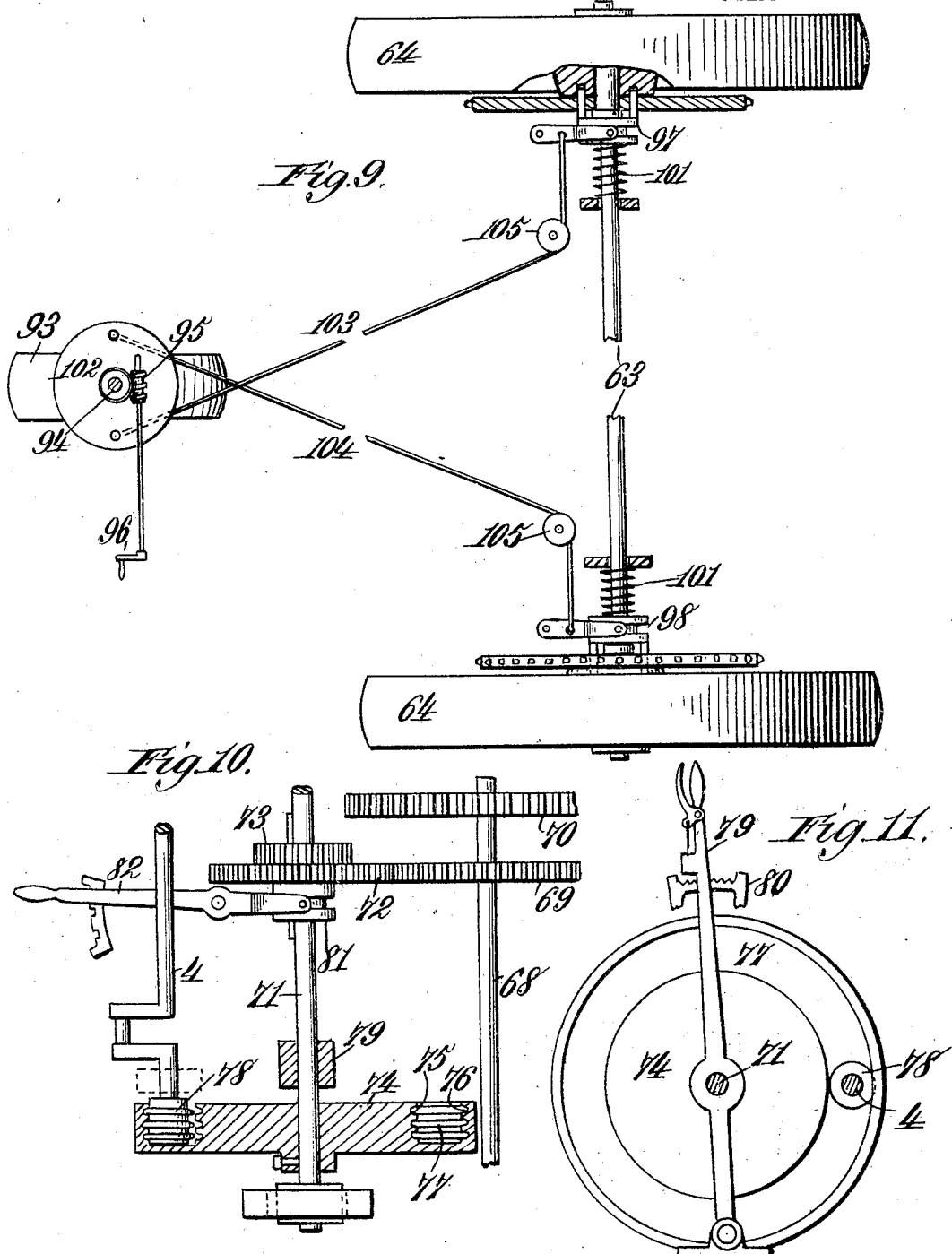

UNITED STATES PATENT OFFICE.

JUAN ZOLLINGER, OF VICTORIA, CHILE.

SELF-PROPELLED HARVESTING-MACHINE.

No. 803,458. Specification of Letters Patent. Patented Oct. 31, 1905.

Application filed August 18, 1905. Serial No. 274,718.

*To all whom it may concern:*

Be it known that I, JUAN ZOLLINGER, a citizen of Chile, residing at Victoria, Province of Malleco, Chile, have invented certain new and useful Improvements in Self-Propelled Harvesting-Machines, of which the following is a specification.

This invention relates to a self-propelled harvesting-machine of a novel construction and adapted in use to cut the grain, thresh the same, and clean, separate, and grade the seed, so that the whole or perfect seed will be delivered outside of the machine or into sacks at one point and the imperfect or broken seeds and other small articles, commonly designated as "screenings," will be separately delivered. The straw is conveyed and the chaff blown out of the machine in the usual manner. The motor that propels the machine also operates all of the mechanism thereof, and as this motor may be of any of the types of gas or explosion motors now commonly employed on automobiles no danger is to be feared from fire. Only two men are required to operate the machine—one to guide it and attend to its correct operation and the other to attend to the removal of the grain as delivered from the machine.

Objects of the invention relate to a vertically-adjustable frame carrying cutters and in the organization and operation of parts mounted thereon and connected therewith and in the organization and operation of certain parts for permitting the proper steering of the machine.

In order that the invention may be clearly understood, I have illustrated the same in the accompanying drawings, in which—

Figure 1 is a side view, in sectional elevation, of a harvesting-machine constructed according to my invention. Fig. 2 is a broken plan view of the same, the mechanism for the final separation and cleaning of the grain being removed to better illustrate the construction. Fig. 3 is a rear view, partly in section, of the cutting-frame and mechanism carried thereby. Fig. 4 is a section on the line 4 4 of Fig. 1 viewed in the direction of the arrow. Fig. 5 is a section on the line 5 5 of Fig. 1 viewed in the direction of the arrow. Fig. 6 is a view in sectional elevation, illustrating the mechanism for raising and lowering the cutter-frame and for driving the cutter-bar and conveyers carried by said frame. Fig. 7 is a horizontal section of the same. Fig. 8 is a sectional detail showing the connection between the main frame and the cutter-frame. Fig. 9 is a detail sectional plan view showing the steering mechanism and the clutch mechanism combined therewith. Fig. 10 is a sectional detail view showing the reversing and part of the driving mechanism, and Fig. 11 is a sectional detail showing the mechanism for throwing the reversing friction-gear.

Referring now to the drawings, in which like reference-numerals indicate similar parts throughout the several views, 1 indicates the frame of the machine, on which is supported a motor 2, having a piston 3, driving a crank-shaft 4, from which latter the machine is propelled and all of the parts thereof are operated. Slidably mounted on one end of the frame 1 at what in operation is the forward end of the machine is a supplemental frame 5, supporting at its lower end a cutter 6 of any preferred construction and operated in any usual or preferred manner, such as hereinafter indicated, from the source of power through the medium of a connecting-bar 7. Mounted in the frame 5 is also a reel 8 and endless conveyers 9, 10, 11, and 12, provision being made for suitably operating these parts, as shown. In the forward movement of the machine the rotation of the reel 8 causes the grain to be bent backward within the frame 5, and as the grain is severed by the cutters it will fall upon the endless conveyer 9, which latter works in substantially the same plane as that of the cutters and is driven in a direction to carry the severed grain continuously toward one side of the machine or from right to left, as indicated in Fig. 3. At the delivery end of the conveyer 9 the severed grain is forced by the conveyer 9 against the conveyer 10 and between the latter and the conveyer 11 and is elevated by the combined action of the two last-named conveyers, which, as shown, occupy a substantially parallel relation. The upper portion of the conveyer 11 is arranged in a horizontal position, as indicated at 13, and as the grain reaches the top of the two conveyers 10 and 11 it is carried forward for a short distance toward the middle of the machine by the horizontal portion 13 of the conveyer 11 and delivered upon the endless conveyer 12. The latter conveyer operates to carry the grain falling upon it backward and to deliver the same to the thresher, which consists, as usual, of a cylinder 14 and concave 15. A rotating feeder 15ª is provided for properly delivering the cut grain to the thresher. The frame 5 is vertically adjustable through the medium of a worm 16, meshing with a worm-gear 17 on a shaft 17ª, having at opposite ends gears 17ᵇ in mesh with racks 17ᶜ on the frame 5. When it is desired to thresh grain which has already been cut, the frame 5 may be lowered to the ground, so as to bring the endless conveyer 12 more nearly to a horizontal position, and thus enable the grain to be thrown upon the conveyer with greater facility. Adjustable hangers 18 are provided for the conveyer 12, so that the latter may be held taut in any adjusted position of the frame 5. Fig. 1 shows the extreme upward adjustment of said frame. From the concave 15 the straw and grain pass to an endless conveyer 19 under the action of a rotary beater 20. Arranged in line with the conveyer 19 is a conveyer 21, and located between the conveyers 19 and 21 is a rotary feeder 22, which travels in the same direction as the conveyers 19 and 21, a sufficient space being left between the said feeder and the ends of the conveyers 19 and 21 to permit grain to fall between these parts. The grain and straw delivered from the thresher are carried backward by the conveyer 19, and the seed falls through the space left between the feeder 22 and the conveyers 19 and 21, whereas the feeder 22, due to the direction of its rotation, will tend to prevent any straw from passing through the space provided between it and the end of the conveyer 19 and will cause said straw to pass on to the endless conveyer 21, where it is delivered to the outside of the machine, there to fall upon the ground or be delivered to a conveyer and carried to a wagon or other receptacle, such latter construction not being shown. The axle of the pulley 23, supporting the outer end of the endless conveyer 21, is provided with a crank-pin for operating a connecting-rod 24, pivotally connected to the crank of a vibratory knocker 25, which is mounted for rocking movement within the conveyer 21, as indicated at 26. As the pulley 23 revolves the connecting-rod will cause the opposite ends of the knocker 25 to be alternately raised and lowered to hit the upper and lower sides of the conveyer 21, whereby to dislodge from the straw any seeds which may have been carried forward onto said conveyer. These seeds will fall through the conveyer upon a pan 27, located beneath the conveyer, and be carried in a forward direction over said pan by the under side of the conveyer and discharged in common with the seed falling between the conveyers 19 and 21 and the feeder 22 upon a sieve 28 of a shaking-screen 29. The shaking-screen 29 comprises a bottom and side walls and a top formed by the sieve 28. The opposite ends of the screen are open, these openings being of different sizes, the larger opening facing the open end of a fan-casing 30, in which is mounted a fan or blower 31, and the smaller opening 32 being located at the rear end of the screen for the purpose of discharging the chaff blown out of the screen by the fan 31 to the outer air. The bottom 33 of the screen is inclined forwardly and its inner end is located above a trough 34, in which is mounted a worm-conveyer 35.

In the operation of the machine the shaking-screen 29 is continuously agitated through the medium of a rod 36, which is pivotally connected to the bottom of the screen at one end and at its other end to an eccentric on the shaft 37 of the fan. The screen 29 is pivotally supported toward its rear end by means of hangers 37ª from arms 38 on a shaft 39, pivotally mounted in the frame of the machine. Toward its forward end said screen is pivotally supported by means of hangers 40 from the frame of the machine. The shaft 39 has a lever-arm 40ª, which is connected to a rod 41.

42 indicates an inclined elevator, the lower end of the casing of which is united with one end of the trough 34, containing the conveyer 35, so that the seed falling through the sieve 28 upon the bottom 39 of the shaking-screen will fall into the trough 34 and be conveyed by the worm 35 to the elevator 42, which latter elevates the seed and discharges the same through a spout 43 upon the upper sieve 44 of a shaking-screen 45. The shaking-screen 45 is agitated in a manner similar to that of the screen 29, the mechanism for this purpose being omitted to avoid confusion. The seed falling through the sieve 44 drops upon a second sieve 46, and the seed falling through this latter sieve drops upon a third sieve 47, the rear end of which is located over a casing 48, containing a worm-conveyer 49. The seed passing through the sieve 47 falls upon a pan 50, constituting the bottom of the shaking-screen 45, the rear end of which pan is located over a trough 51, containing a worm-conveyer 52. The seed and unthreshed grain which fails to pass through the sieve 44 drops from said sieve onto the conveyer 12 and is again subjected to the threshing operation. The forward end portion of the sieve 46 is provided with larger meshes than the remainder of the sieve, as indicated at 53, and any lumps of dirt or foreign matter failing to pass through the sieve 46 will pass through the wider meshes of the portion 53 and drop into a box 54 provided for that purpose. The portions of straw or unthreshed grain which pass off of the screen 46 will also be delivered upon the conveyer 12 and again be subjected to the threshing operation. The sieve 47 constitutes the final means for cleaning and separating the seeds. The meshes in this sieve are of such size that perfect grains will not pass through, but will roll over the sieve and fall into the trough 48 and be carried by the worm-conveyer 49 to the side of the machine, where they will be delivered into a sack or other receptacle. Broken grain and other fine particles will pass through the meshes of the sieve 47 and fall upon the pan 50, over which they will roll into the trough 51 and be carried by the worm-conveyer 52 to the outside of the machine and there delivered into a suitable receptacle. The shaking-screen 45 is pivotally supported at its rear end by means of hangers 55 and at its forward end is pivotally supported by means of hangers 56 from arms 57 on a shaft 58, pivotally mounted in the machine. A lever-arm 58$^a$ on said shaft is connected to one end of the rod 41, the opposite end of which is connected to the lever-arm 40$^a$, as previously described. Intermediate its ends the rod 41 is fixedly secured to the outer end of a crank-arm 59, carried by a rock-shaft 59$^a$, suitably mounted in the frame of the machine, which rock-shaft is provided with a pendent arm carrying a weight 60. The purpose of this construction is to balance the shaking-screens 29 and 45—that is, to insure that their sieves shall always be held at the proper inclination, so that the seeds will travel over them in the right direction. If this automatic adjustment or balancing of the screens were not provided, it would be obvious that should the machine be traveling up an incline or down a declivity the inclination of the screens would vary, and thus the seeds be caused to roll over the screens in the wrong direction. With the construction described, however, any change in position of the machine from the horizontal will be automatically compensated for by the swinging weight 60, which through the medium of the rod 41 and lever-arms 40$^a$ and 58$^a$ will operate to vary the inclination of the two shaking-screens in proportion to the variation in the position of the machine. The shaking-screen 45 is open at opposite ends, the rear end facing an opening in a fan-casing 61, containing a fan 62, and this fan operates to blow chaff from the seed delivered upon the sieve 44 through the shaking-screen to the outer air.

63 indicates the main axle of the machine, having mounted thereon the wheels 64 for supporting and driving the machine. On opposite sides of the machine the axle 63 is provided with sprocket-wheels 65, rotatably mounted thereon, over which pass sprocket-chains 66 to small sprocket-wheels 67, mounted on a driven shaft 68. Fixedly secured on the driven shaft 68 is a small gear-wheel 69 and a large gear-wheel 70.

71 indicates a drive-shaft which is provided with a gear-wheel 72 of about the same size as the gear-wheel 69 and with a smaller gear-wheel 73, which is adapted to be brought in mesh with the large gear 70 of the driven shaft 68 for the purpose of changing the rate of travel of the machine. Mounted on the drive-shaft 71 is a relatively large reversing friction-gear 74, provided on its interior with a double set of friction-grooves 75 76, affording between them an annular space or race 77. Mounted on the crank-shaft 4 is a friction-gear 78 of a somewhat less diameter than the distance between the two sets of friction-grooves 75 and 76 and which occupies a position within the race 77.

79 indicates a throw-lever pivotally mounted on the frame of the machine and loosely embracing the drive-shaft 71, and by throwing this lever to one side or the other the friction-gear 74 will be moved to cause either the friction-grooves 75 or 76 to engage the friction-gear 78 to reverse the direction of movement of the machine. A rack 80 is provided for engagement by a dog or ratchet on the lever 79 for holding the friction-gear 74 in the position to which it is moved. Only a very slight movement of the friction-gear 74 is required in reversing the movement of the machine, and this movement can be effected without in any manner disarranging the engagement of the gears 69 and 72 or 70 and 73.

In order to provide for a faster or slower rate of movement of the machine, the gears 72 and 73, which are united to each other, are splined on the shaft 71, so as to be capable of sliding thereon, and I connect to said gears a collar 81, which is engaged by a throw-lever 82. When the gears 69 and 72 are in mesh, the machine will have the maximum rate of speed. When the gears are moved to bring the gear 73 into engagement with the gear 70, the machine will be caused to move at a slower rate of speed. When the machine is to be used merely for threshing grain, then the gears 72 and 73 are moved to a position where neither gear will mesh with the gears of the driven shaft 68 or the reversing friction-gear 74 is moved out of contact with the friction-gear 78, and thus the machine will remain stationary, while the power of the motor is communicated solely to the threshing and conveying mechanism.

Of course in using the machine solely for threshing the operation of the cutter 6 will be discontinued, and this is effected by throwing the operating mechanism therefor out of operative relation in any well-known manner. Mounted on the crank-shaft 4 is a sprocket-gear 83, which communicates motion to the shaft 84 of the cylinder 14 through the medium of a sprocket-chain 85, passing over the sprocket 83 and the sprocket-wheel 86 on the shaft 84. The blower 37 is revolved by means of a crossed belt 87, passing over a pulley 88 on the shaft 37 of said blower and a pulley 89 on the shaft 84 of the cylinder. In a similar manner the worm-conveyer 35 is driven by a belt 90 from the shaft 37, and the endless conveyer 21 is driven by a sprocket-chain 91 from a shaft 92 of the worm-conveyer 35.

The machine is steered by means of a wheel 93, mounted in a rotary bearing 94, which is controlled by a worm 95, operated from a handle 96 in a well-known manner. As the wheels 64 are positively driven, it is necessary to provide for breaking the driving connection when the wheel 93 is to be turned to one side or the other. For this purpose I provide sliding clutch members 97 98, respectively, loosely mounted on the shaft 63 and normally held in engagement with the sprocket-wheels 65 and the wheels 64 by means of springs 101. A disk 102, which is connected to the bearing of the wheel 93 and which is rotated in one direction or the other by the worm 95, has connected to its opposite sides chains 103 104. The chain 103 is connected to the clutch member 97 and the chain 104 to the clutch member 98, suitable idler-pulleys 105 being provided for each chain to cause it to exert a pull in a substantially straight direction on its corresponding clutch member. It will be clearly apparent that if the machine is to be turned, say, to the right as the steering-wheel is rotated in its bearings for this purpose a corresponding rotation of the disk 102 will cause the chain 103 to pull the clutch member 97 out of engagement with the wheel 64, so that the wheel 64 on the right-hand side of the machine will be free to rotate independently of the sprocket-wheel 65. The same operation will occur on the opposite side of the machine if the wheel 93 is turned to the left. The springs 101 cause the clutches to again engage in the wheels 64, and thus lock said wheels to the sprocket-wheels 65 when the steering-wheel is turned straight. A sufficient slack is maintained on the chains 103 104 to admit of slight movement of the steering-gear 103 without effecting the engagement of the clutch members. A guard 106 is located beneath the lower end of the conveyer 12 in order to catch any grain carried beyond the concave by the conveyer and cause it to fall upon the endless conveyer 19.

The driving connections not heretofore described may be now briefly referred to. The endless conveyer 19 is driven by a sprocket-chain 107 from the shaft 84 of the cylinder, as shown more clearly by Fig. 2. The shaft 108 at the outer end of this conveyer also carries a sprocket-wheel 109 for driving the endless conveyer 12 by means of a chain 110, the latter being indicated only in Fig. 1 and by dotted lines therein. The shaft 108 also drives a sprocket-chain 111, (shown in Fig. 2,) which passes over a sprocket-wheel 112 on a shaft 113. (Shown in Figs. 6 and 7.) From the shaft 113 the various parts carried by the adjustable frame 5 are driven as follows: The shaft 113 has universal connections 114 and a telescoping connection 115 with a second shaft 116, the latter shaft being mounted in a bearing 117, carried by the adjustable frame 5, the shaft 113 being on the stationary frame 1 of the machine proper. The connections 114 and 115 are for the purpose of permitting the vertical movement of the frame 5, and to this end the vertical frame member of the frame 1 is provided with a slot 118 for accommodating the movement of the shaft 116, carried by the adjustable frame. The shaft 116 has on its outer end a pulley 119 for a belt 120, passing over a similar pulley 121 on a shaft 122 of the reel 8, the belt 120 passing over guide-pulleys 123, as shown in full lines in Fig. 2 and in dotted lines in Fig. 1. Intermediate its ends the shaft 116 has a beveled gear 124, which drives a beveled gear 125 on a shaft 126, as shown by Figs. 6 and 7. The shaft 126 carries at its end a wrist-pin 127, to which is connected the rod 7 (shown by Fig. 2) for reciprocating the cutter-bar. On the shaft 126 is also a gear-wheel 128, (shown in Fig. 7,) which meshes with a similar gear-wheel 129, (shown in Fig. 6,) which latter operates through the medium of a pulley to drive a belt 130, which latter drives a pulley on the shaft 131, which latter conveys motion to the combined elevator and conveyer 11 13. On the shaft 126 is also a belt-pulley for driving a belt 132, which latter imparts motion to a pulley 133 on a shaft 134, which latter imparts motion to the horizontal or platform conveyer 9. The portion of the shaft 126 between the wrist-pin 127 and the gear 128 is utilized for driving the upright conveyer 10.

The course of the grain and seed, respectively, through the machine has been sufficiently indicated in the description of the mechanism, and it only remains to emphasize the fact that the construction shown and described presents a combined machine capable of cutting and threshing grain and of thoroughly cleaning and separating the seed, which machine is simple in construction, compact in the arrangement and organization of its parts, and one that may be manufactured at very much less expense than any other machine of which I am aware having similar operations in view.

Having thus fully described my invention, what I claim as new, and desire to secure by Letters Patent, is—

1. In a harvesting-machine, in combination with a wheeled body supporting threshing mechanism, a vertically-adjustable frame mounted on said body and carrying cutters, means on said frame for elevating the cut grain, and a conveyer for delivering the cut grain to the threshing mechanism, said conveyer having one end mounted on said body and its other end supported for bodily movement on said frame.

2. In a harvesting-machine, in combination with a wheeled body supporting threshing mechanism, a vertically-adjustable frame mounted on said body and carrying cutters, a conveyer for delivering cut grain from said frame to said threshing mechanism, said conveyer having one end supported on said body, and means for supporting for bodily movement the other end of said conveyer from said frame.

3. In a harvesting-machine, in combination with a wheeled body supporting threshing mechanism, a vertically-disposed frame mounted on said body and carrying cutters, means for adjusting said frame, a conveyer for delivering cut grain from said frame to said threshing mechanism, said conveyer having one end supported on said body, and means for supporting for bodily movement one end of said conveyer from said frame.

4. In a harvesting-machine, in combination with a wheeled body supporting threshing mechanism, a vertically-adjustable frame mounted on said body and carrying cutters, a conveyer for delivering cut grain from said frame to said threshing mechanism, said conveyer having one end mounted on said body, means for supporting for bodily movement the other end of said conveyer from said frame, a motor for driving said machine, and means actuated by said motor for operating the cutters, conveyer, and thresher.

5. In a harvesting-machine, in combination with a wheeled body supporting threshing mechanism, a vertically-adjustable frame mounted on said body and carrying cutters, a conveyer for delivering cut grain from said frame to said threshing mechanism, said conveyer having one end mounted on said body and its other end mounted for bodily movement on said frame, a motor for driving said machine, and means including a flexible shaft actuated by said motor for operating the cutters, conveyer, and threshing mechanism.

6. In a harvesting-machine, in combination with a wheeled body supporting threshing mechanism, a vertically-adjustable frame mounted on said body and carrying cutters, a rotatable reel mounted on said frame, a system of longitudinally and vertically disposed conveyers also mounted on said frame, an endless conveyer for delivering the elevated grain to said threshing mechanism, said conveyer having one end mounted on said body, and means for supporting for bodily movement one end of said last-named conveyer from the frame.

7. In a harvesting-machine, in combination with a wheeled body supporting threshing mechanism, a vertically-adjustable frame mounted on said body and carrying cutters, a rotatable reel mounted on said frame, a system of longitudinally and vertically disposed conveyers also mounted on said frame, an endless conveyer for delivering the elevated grain to said threshing mechanism, said conveyer having one end mounted on said body, means for supporting for bodily movement the other end of said last-named conveyer from the frame, a motor for driving said machine, and means actuated by said motor for operating the reel cutters, thresher, and all of said conveyers.

8. In a self-propelled harvesting-machine, in combination with the wheels of said machine, a motor, mechanism associated therewith and with said wheels for driving the latter, a steering-wheel, means operated by the turning of said steering-wheel for disconnecting one or the other of the wheels of the machine from the driving mechanism in accordance with the direction in which the steering-wheel is turned, cutting mechanism for cutting standing grain, a thresher, and mechanism for delivering the cut grain to the thresher.

In testimony whereof I have hereunto set my hand in presence of two subscribing witnesses.

JUAN ZOLLINGER.

Witnesses:
BRUCE S. ELLIOTT,
HARVEY S. W DE GAU.